United States Patent

Dent et al.

[11] Patent Number: 5,809,141
[45] Date of Patent: Sep. 15, 1998

[54] METHOD AND APPARATUS FOR ENABLING MOBILE-TO-MOBILE CALLS IN A COMMUNICATION SYSTEM

[75] Inventors: Paul W. Dent, Pittsboro; Sandeep Chennakeshu, Cary; Rajaram Ramesh, Cary; Stanley L. Reinhold, Cary, all of N.C.

[73] Assignee: Ericsson Inc., Research Triangle Park, N.C.

[21] Appl. No.: 681,916

[22] Filed: Jul. 30, 1996

[51] Int. Cl.$^6$ .................................................. H04K 1/00
[52] U.S. Cl. .................................................. 380/23; 380/49
[58] Field of Search ................................ 380/23, 49, 50; 379/59; 455/33

[56] References Cited

U.S. PATENT DOCUMENTS

5,613,197  3/1997  Copeland et al. ......................... 455/22
5,631,898  5/1997  Dent ........................................ 370/203

*Primary Examiner*—David C. Cain
*Attorney, Agent, or Firm*—Burns, Doane, Swecker & Mathis, L.L.P.

[57] ABSTRACT

A communication system is disclosed which reduces loop delay when a first wireless phone calls a second wireless phone wherein the first and second phones are served by the same relay station. The communication system includes a relay station for communicating with the first and second wireless phones. A transponder located in the relay station relays signals received from one mobile station on a first frequency band to another mobile station on a second frequency band. In addition, the transponder sends the received signals to a controller which controls the operation of the transponder using control information.

22 Claims, 5 Drawing Sheets

METHOD AND APPARATUS FOR ENABLING MOBILE-TO-MOBILE CALLS IN A COMMUNICATION SYSTEM

FIELD OF THE INVENTION

The present invention relates to calls between two wireless mobile stations in a communication system, and more particularly to a method and apparatus for decreasing the amount of delay in signals transmitted between the two wireless mobile stations and a method for enciphering mobile-to-mobile calls.

BACKGROUND OF THE INVENTION

Figure 1:
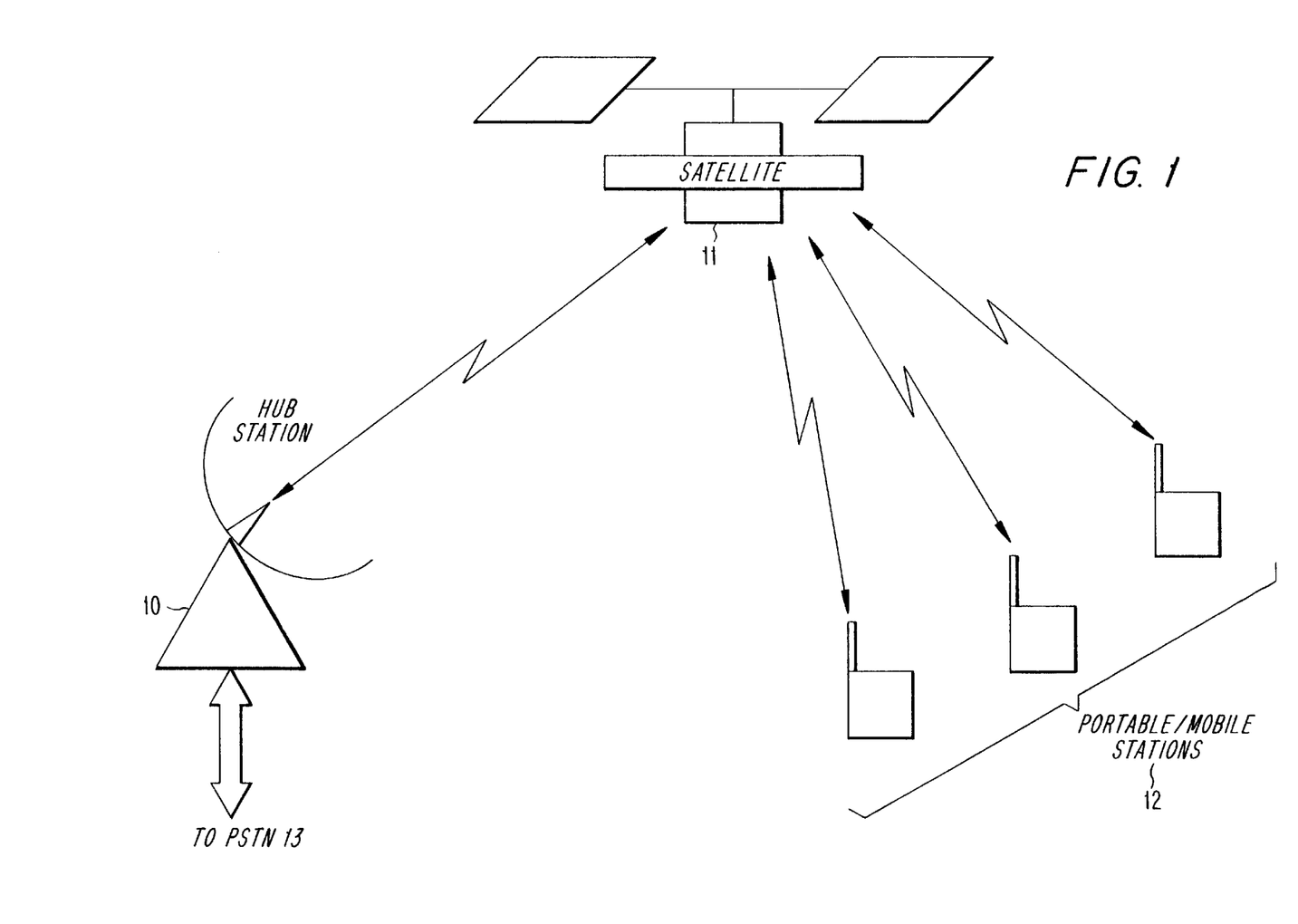
FIG. 1 illustrates a satellite communication system.

FIG. 1 illustrates a block diagram of a satellite communication system. A satellite 11 is in communication with at least one ground station or hub station 10 as well as a plurality of mobile stations 12. The satellite contains a multiple beam antenna. The mobile stations are each serviced by an appropriate antenna spot beam from the multiple beam antenna. The hub station 10 communicates with the satellite using, for example, C-band or Ka band frequencies, while the satellite communicates with the mobile stations using, for example, L-band frequencies in the uplink direction and S-band frequencies on the downlink direction. In most cases, most calls will be between mobile stations and ordinary telephones connected to the public switch telephone network (PSTN) 13. The hub station 10 accepts calls from the PSTN 13 and relays them to the mobile stations 12 via the satellite 11, and conversely accepts the calls from the mobile stations 12 relayed from the satellite 11 and connects the calls to the PSTN 13. A small percentage of calls may be mobile station to mobile station calls, wherein the hub station 10 directly connects the mobile stations to each other without necessarily involving the PSTN. In such cases, signals from one mobile station are relayed through the satellite 11 to the hub station 10 which processes the signals and sends the signals to the receiving mobile station via the satellite 11.

In each antenna beam, one of the relayed signals performs the function of calling channel (paging channel) and broadcast channel. This channel carries system information needed by the mobile stations in that beam (the broadcast information, e.g., beam ID, satellite motion information, etc.) and also information addressed to individual mobile stations (network originated calls or pages). Since each calling channel is intended for reception only by mobile stations in its beam, the Doppler shift can, in principle, be coarsely corrected for the mean perceived by all mobile stations in the beam. For example, the Doppler shift can be arranged to be zero at the center of the beam. An example of ground station and satellite architecture suitable for implementing the present invention may be found in U.S. patent application Ser. No. 08/179,953, entitled "A Cellular/Satellite Communication System With Improved Frequency Reuse," which is hereby incorporated by reference.

Figure 2:
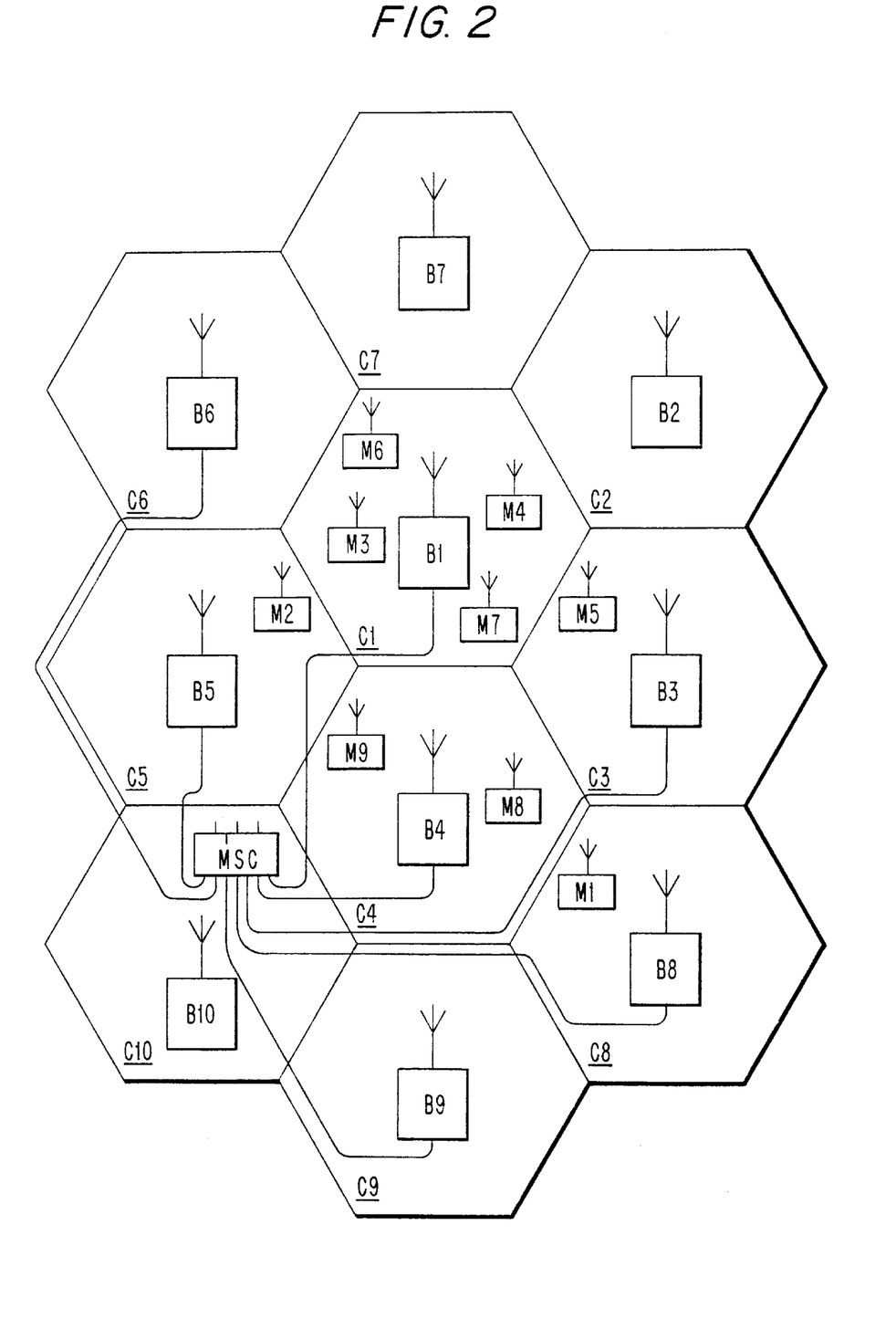
FIG. 2 illustrates a standard cellular communication system.

A typical cellular communication system is illustrated in FIG. 2. FIG. 2 illustrates 10 cells, C1–C10, in a typical cellular mobile radio communication system. Normally, a cellular mobile radio system will be implemented with more than 10 cells. However, for the purposes of simplicity, the present invention can be explained using the simplified representation illustrated in FIG. 2. For each cell, C1–C10, there is a base station B1–B10 with the same reference number as a corresponding cell. FIG. 2 illustrates the base stations as situated in the vicinity of the cell center and having omni-directional antennas. The base stations can also be situated as cell borders and use directional antennas.

FIG. 2 also illustrates nine mobile stations, M1–M9, which are movable within a cell and from one cell to another. In a typical cellular radio system, there would normally be more than nine cellular mobile stations. In fact, there are typically many times the number of mobile stations as there are base stations. However, for the purposes of explaining the present invention, the reduced number of mobile stations is sufficient. Also illustrated in FIG. 2 is a mobile services switching center MSC. The mobile services switching center MSC is connected to all of the base stations by cables. The mobile switching center MSC is also connected by cables to the fixed switched telephone network or similar fixed network. All cables from the mobile services switching center MSC to the base stations B1–B10 and cables to the fixed network are not illustrated. In addition to the mobile services switching center illustrated, there may be additional mobile services switching centers connected by cables to base stations other than those illustrated in FIG. 2. Instead of cables, other means, for example, fixed radio links, may also be used between base stations and mobile services switching centers. The mobile services switching center MSC, the base stations, and the mobile stations are all computer controlled.

In prior art systems, when a first mobile station wants to contact a second mobile station, both of which are being served by the same base station or relay station, signals from the first mobile station would be sent to the base station and then forwarded to the mobile services switching center connected to the base station. The mobile services switching center would process the received signals and transmit them back to the base station which forwards the signals to the second mobile station.

A communication satellite in orbit at a great distance above the earth, acts as a relay station between mobile telephone subscriber terminals and an earth station connected to the public switch telephone network. The mobile phones operating in such a system are preferably of dual mode type, that can function either in the land base cellular system or via the satellite if out of range of a cellular base station. One disadvantage of communicating via the satellite is the extra propagation delay caused by having to relay signals to and from the satellite and a ground station, which can be troublesome in trying to hold a conversation. Fortunately, only a small percentage of calls are mobile-to-mobile calls, in which both parties are connected via a satellite.

Another disadvantage of communicating through a relay station is the ease with which eavesdropping can take place. Thus, it is desirable to encipher mobile telephone calls. Each mobile station is typically provided with a unique key called an "A key" by the system operator. The A keys are also stored in a data base in the computer network which is protected from unauthorized access. Furthermore, the A keys are not directly used to encipher communication, but only used during an authentication process to verify a mobile phones claimed identity and to calculate a temporary key or "B key" for enciphering conversations. However, the prior art does not allow direct relaying of signals enciphered by one mobile station for reception and deciphering by another mobile station since they do not have the capability to generate the same B key. This could be solved by encryption in the satellite with one key and re-encryption with another key. However, this would require on-board processing for every mobile-to-mobile call and the transmission and storage of many B keys on board the satellite. It is an object of the present invention to provide a mechanism for establishing a common key between any two mobile stations, thus avoiding the complicated signal processing that would be necessary on board a satellite or other relay station.

SUMMARY OF THE INVENTION

It is an object of the present invention to provide a method and apparatus for enabling mobile-to-mobile calls via a common relay station which reduces the amount of delay present in the system as well as allows for encryption of the signals transmitted to a from the mobile stations.

According to one embodiment of the present invention, a communication system which reduces loop delay when a first wireless phone calls a second wireless phone wherein the first and second phones are served by the same relay station is disclosed. The communication system includes a relay station for communicating with the first and second wireless phones. A transponder means located in the relay station relays signals received from one mobile station on a first frequency band to another mobile station on a second frequency band. In addition, the transponder sends the received signals to a control means which controls the operation of the transponder means using control information.

According to another embodiment of the present invention, a method for providing encryption of a call between two mobile stations relayed through a satellite in a mobile satellite communication system is disclosed. When a first mobile station requests an enciphered connection with a second mobile station, the system determines whether the second mobile station is only reachable by a satellite. When the second mobile station is only reachable by a satellite, the system allocates a direct mobile-to-mobile transponder channel in the satellite for the call. In addition, the system allocates an enciphering code to be used by both of the mobile stations. The systems sends the identification of the transponder channel and the enciphering codes to the first mobile station. In addition, the system informs the second mobile station of the call identification of the transponder channel and the enciphering codes. Finally, the system connects the call wherein both mobile stations use the allocated enciphering code.

BRIEF DESCRIPTION OF THE DRAWINGS

These and other features and advantages of the invention will be readily apparent to one of ordinary skill in the art from the following written description, used in conjunction with the drawings, in which.

DETAILED DESCRIPTION

The present invention will now be described with reference to a satellite communication system. It will be understood by one skilled in the art that the present invention can be applied to other systems which relay messages between two user stations through a relay system.

Figure 3:
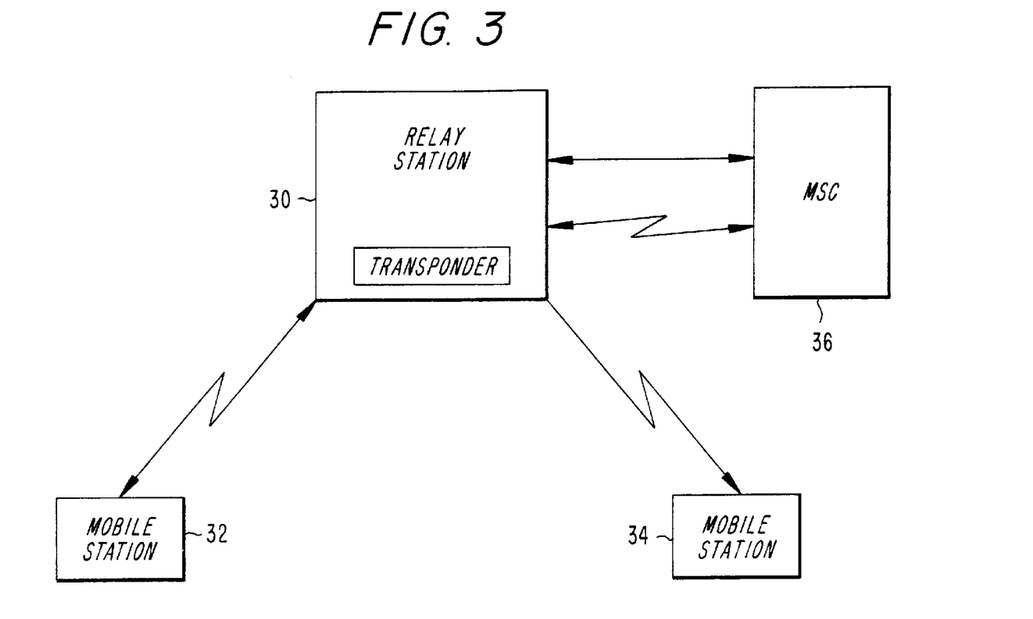
FIG. 3 illustrates a satellite communication system according to one embodiment of the present invention.

The present invention will now be described with reference to FIG. 3. A relay station 30 receives radio signals from mobile stations 32 and 34 using a first frequency band and relays them to a mobile switching center 36 using a second frequency band or land lines. The relay station 30 receives signals from the mobile switching center 36 using a third frequency band or land lines and relays them to the mobile station using a fourth frequency band which may be the same band as the first frequency band. A transponder is provided in the relay station that is under the control of the mobile switching center and can be controlled to cause the relay station to alternatively relay signals received from one mobile station on the first frequency band to another mobile station on the fourth frequency band and vice-versa, thereby providing direct mobile-to-mobile communication bypassing the mobile switching center 36. The relay station can also continue to relay the mobile signals using the second frequency band to the mobile switching center which extracts signalling messages known as slow associated control channel (SACCH) messages.

SACCH messages report mobile station status and the quality of the signals received by the reporting mobile station. SACCH messages from one mobile station can be received by another mobile station and used by the receiving mobile station as an indication for increasing or decreasing transmitter power. SACCH messages from both mobile stations relayed to the mobile switching center 36 may be used by the mobile switching center 36 for a variety of purposes such as to increase or decrease the power transmitted by the transponder 30 to the respective mobile stations 32 and 34.

In addition, urgent messages may be transmitted or received by the mobile stations using the fast associated control channel (FACCH). The FACCH channel is accommodated by taking a position in the transmitted information stream normally occupied by speech or user information. FACCH messages transmitted by either mobile station can be received at the mobile switching center and upon receipt of a call termination message, a billing computer forming part of the mobile switching center ceases to accumulate call charges. The MSC computer may then send a control signal to the transponder 30 terminating the direct mobile-to-mobile relay connection and may transmit a clear down acknowledgement to both mobiles as a FACCH message. To transmit the clear down FACCH message or other commands from the MSC to the mobile station, the MSC may control the transponder 30 to temporarily interrupt the direct mobile-to-mobile relaying operation from one signal unit such as a TDMA burst in order to insert its own FACCH message. The mobile switching center may also terminate the relay operation and send a clear down message if no valid SACCH or FACCH messages are read from one of the mobile stations for a timed out period.

Figure 4:
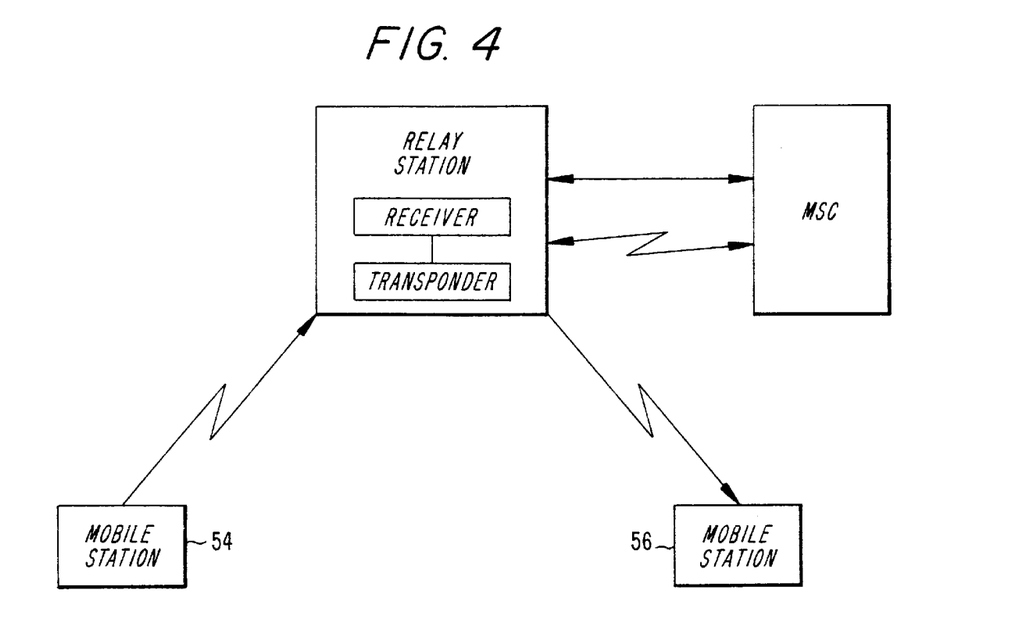
FIG. 4 illustrates a cellular communication system according to one embodiment of the present invention.

According to another embodiment of the present invention, a transponder is provided at a relay station which can demodulate-remodulate a signal, as is illustrated in FIG. 4. A receiver 50 in the relay station receives and decodes a signal from one mobile station 54 and reencodes and transmits it to another mobile station 56 through a demodulate-remodulate transponder 52. In addition, the relay station can send the signal to a mobile switching center 58. The transponder may be controlled by the mobile switching center to separate voice or user data from the SACCH messages received from one mobile and replace the SACCH messages by messages received from the MSC for transmission to another mobile station along with the voice or user data, and vice-versa.

Figure 5:
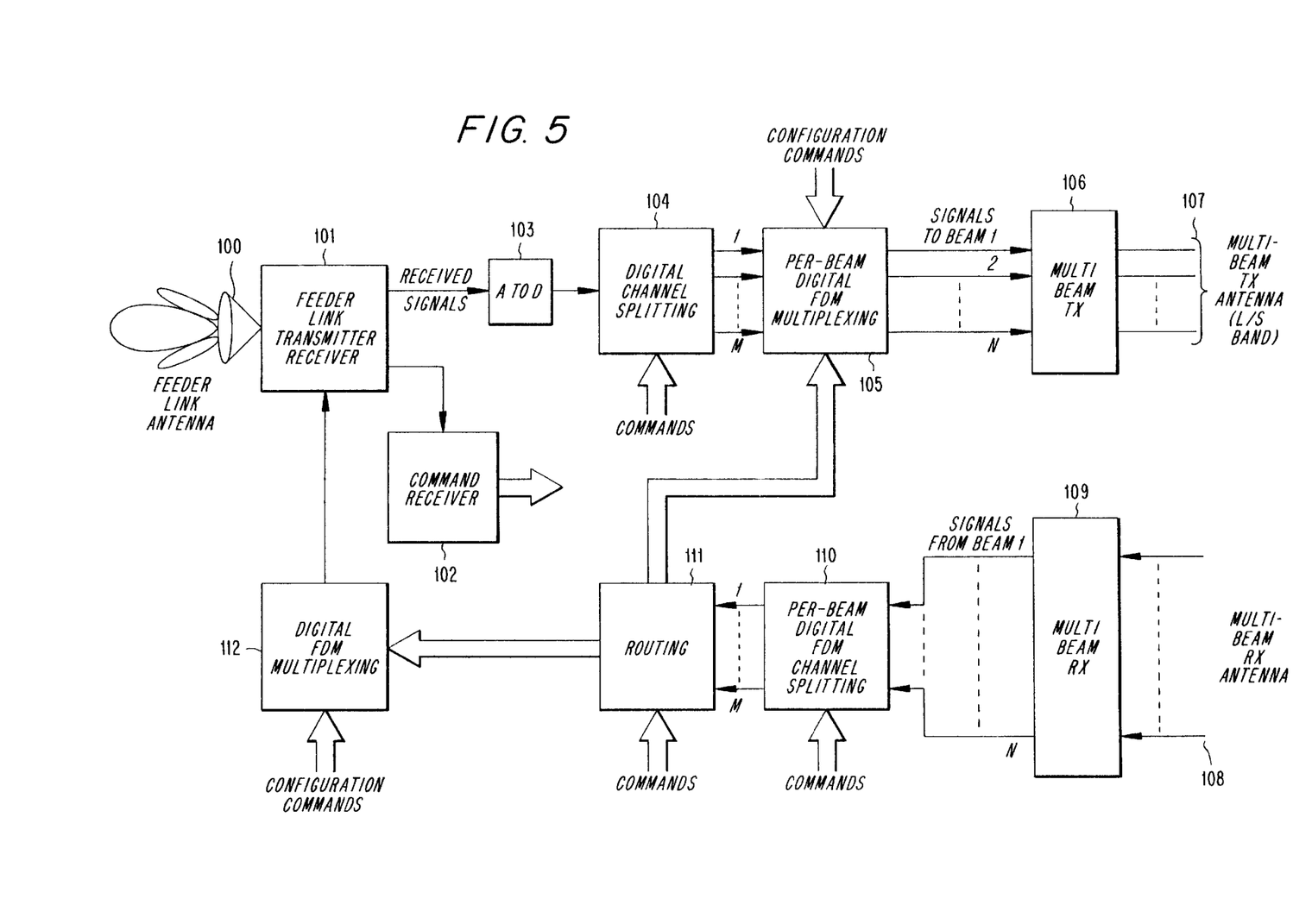
FIG. 5 illustrates a transponder for mobile-to-mobile calls according to one embodiment of the present invention.

FIG. 5 shows the block diagram of a transponder for handling both mobile-to ground and mobile-to-mobile calls. Signals are received from a ground (hub) station on typically K- or C-band frequencies using a feederlink antenna 100. A feederlink receiver and transmitter 101 perform downconversion of received signals and upconversion of signals for transmission respectively. After downconversion, received signals are digitized in a wideband A-to-D convertor 103 so that subsequent filtering may be performed digitally. Digital filtering and separation of individual 200 KHz channels is performed in a channel splitting unit 104. Depending on the number of channels to be separated and their relative spaces, the channel splitting unit 104 may employ a band of digital FIR filters or alternatively a windowed Fast Fourier Transform, both of which are within the current state of the art.

Separated channel signals received on the feederlink are fed to a digital FDM multiplexer 105 as complex baseband signals. The FDM multiplexer performs selection of individual feederlink signals from the channel splitter 104 and selection of signals received from mobile units separately for each downlink beam for transmission to mobile units, and translates the signals to the appropriate relative channel frequency in the digital domain. The multiplexed digital signal for each beam is then converted to an analog intermediate frequency IF signal and is passed to a multibeam transmitter 106 where it is upconverted and amplified for transmission via a multibeam transmit antenna 107 at L/S band.

Signals are received from mobile units by a multibeam receive antenna 108. The transmit antenna 107 and the receive antenna 108 may be different phased arrays, the same phased array including transmit/receive duplexing filters, or a multiple-feed reflector antenna with transmit/receive duplexing filters or separate multiple-feed reflector antennas optimized independently for transmit and receive.

Received signals from mobiles are processed in a multibeam receiver unit 109 which can include A-to-D conversion separately for each antenna feed and digital beamforming if desired. Digital beamforming can be advantageous for both direct radiating arrays and reflector arrays, as disclosed in U.S. patent application Ser. No. 08/179,953, filed Jan. 11, 1994, which is incorporated herein by reference.

The multi-beam receiver unit 109 passes signals preferably now in digital form to a per-beam digital FDM channel splitting unit 110, which can, for example, comprise a band of FIR filters for each beam to divide uplink signals into 200 KHz or 50 KHz channels. Separated 200 KHz channel signals are routed via a programmable routing unit 111 to a digital FDM multiplexer 112 for remultiplexing for transmission via the feederlink transmitter 101 and the antenna 100 to the ground network. In addition, certain mobile signals received for transponding to other mobile units without first being sent to the ground network are separated into 50 KHz channels and subjected to a 4:1 time compression to convert them to 200 KHz channel signals of one quarter the burst length. The compressed signals are routed to the digital FDM multiplexer 105 for multiplexing to the appropriate downlink carrier and beam for reception by the target mobiles.

The per-beam digital FDM multiplexer is preferably completely programmable to select any of the signals received either via the feederlink receiver 101 or via the L/S band receivers 109 for multiplexing to any downlink L/S band frequency and any beam. Likewise, the per-beam digital FDM channel splitting unit 110 is preferably programmable via a command input to filter any L/S band uplink signal received on any uplink carrier frequency in any beam. By programming the center frequencies of the FIR filters within the FDM channel splitting unit 110 for each beam, the beam-to-beam frequency re-use plan may be determined to control co-channel interference (C/I) to an acceptable level.

Commands to configure the feederlink digital channel splitter 104, the FDM multiplexers 105 and 112, the channel splitters 104, 110 and the routing selection unit 110 are received from the ground network by a command receiver 102 and passed to the individual units.

It may be understood that units 104, 105, 110, 111, and 112 may all form part of the same digital signal processor having a shared memory for signal samples, and therefore routing of signals between units may be accomplished by specifying memory addresses into which signal samples shall be placed or retrieved. The above-mentioned time-compression of samples received in a 50 KHz channel to obtain a 200 KHz bandwidth signal may be accomplished merely by writing samples to said memory at a first sample rate and reading them from memory at a second sample rate.

In the inventive TDMA format for mobile satellite communication, TDMA bursts in 12 consecutive 16-slot frames comprise user voice or data traffic while the 13th frame comprises signalling information known as the Slow Associated Control Channel (SACCH). SACCH bursts are normally generated in the ground network to control mobile operation or generated in the mobile to send status information to the network. It is therefore inappropriate to send SACCH generated in one mobile to another mobile.

The inventive transponder may include timing means within the digital FDM multiplexer 105 to count from 1 to 13 to determine when an SACCH burst is due. The SACCH burst received from a mobile is always routed to the ground via routing unit 11 and feederlink multiplexer 112, but is interrupted from being sent to another mobile by unit 105 selecting instead to transpond an SACCH burst received from the ground network via channel splitting unit 104. In this way, voice and data traffic is routed directly from mobile to mobile thus avoiding the double round-trip delay, while SACCH status information from the mobiles continues to be routed to the ground network and control commands from the network continue to be routed to the mobiles. In this way the network is able to retain control of mobile functions such as timing and power level as well as being able to monitor and control the mobile-to-mobile connection for billing purposes. In this way, mobile stations are in direct communication with each other as far as voice or user data is concerned, bypassing the mobile switching center, but are in separate communication with the mobile switching center with regard to SACCH messages. Likewise, for FACCH messages, the mobile switching center can control the transponder to replace speech, user data, or FACCH messages transmitted by one mobile station by FACCH messages transmitted by the mobile switching center for reception by the other mobile station or vice-versa. SACCH or FACCH messages replaced in this way provide a means for the mobile switching center to command power or timing changes of the transmissions from mobiles that are in direct connection with one another such that burst transmission arriving at the relay stations from different mobiles do not overlap and form a time divisional multiplex signal frame.

Figure 6:
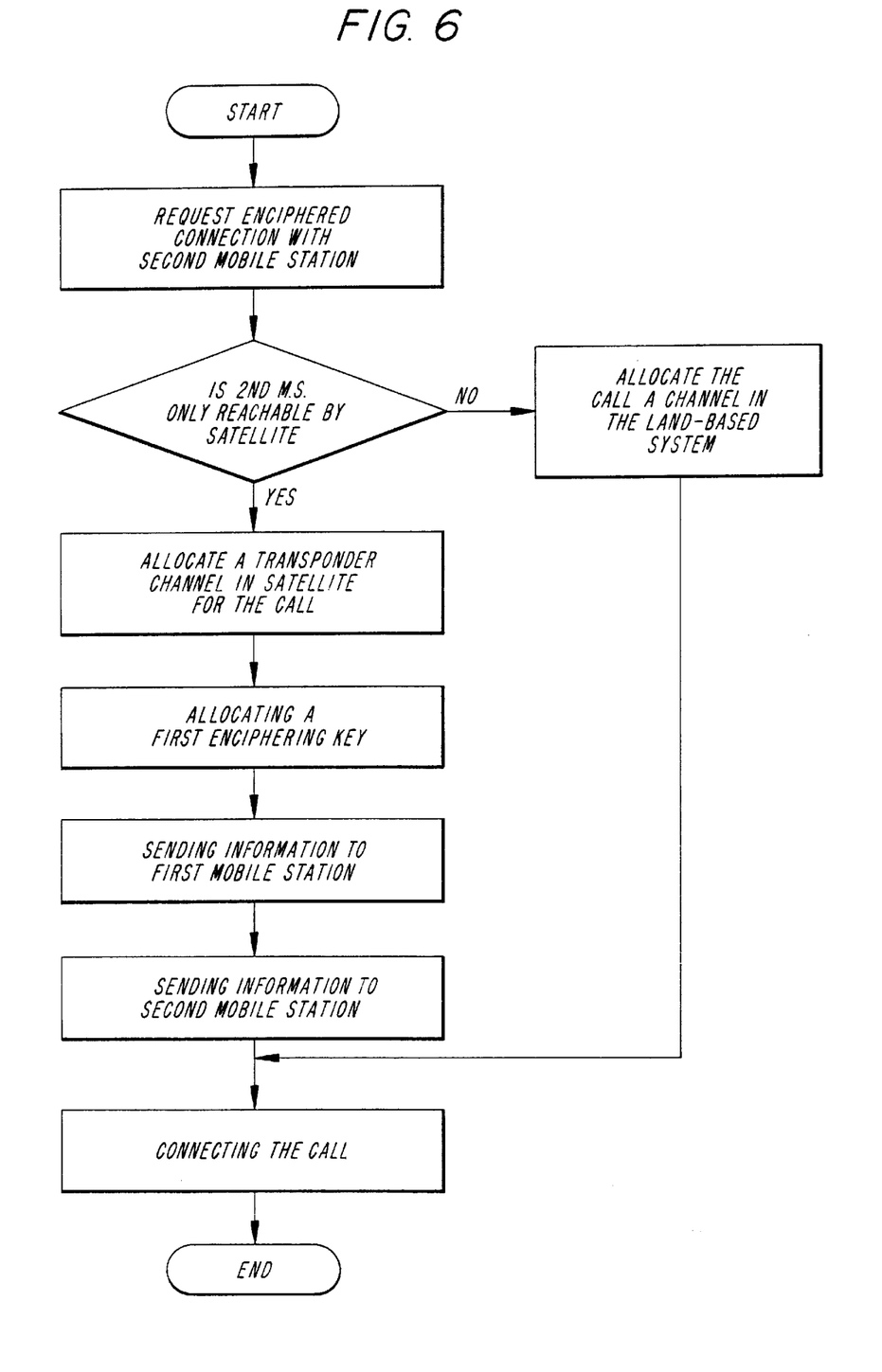
FIG. 6 is a flow chart illustrating an encryption method according to one embodiment of the present invention.

According to another embodiment of the present invention, a method is disclosed for encrypting signals sent between two mobile stations through the same satellite relay station as is illustrated in FIG. 6. At call set-up, a mobile station is in contact via the satellite in a satellite communication system with a network computer, with which is lodges its request for an enciphered connection with another mobile station. Upon determining that the other mobile station is only reachable via the satellite, the network computer allocates a direct mobile-to-mobile transponder channel in the satellite relay station for the communication. However if it is determined that the call can be connected to the second mobile station by a land based communication system, the call is allocated a channel in the land based system. The network computer provides an identification of the selected channel to the requesting mobile. The network computer then allocates an enciphering key to be used by both mobiles and communicates it to the first mobile enciphered with the mobile's A key or, alternatively, with the mobile's B key computed during the last authentication procedure. The network computer then contacts the called mobile station and informs it of the call, the allocated transponder channel, and the allocated enciphering key enciphered using the called mobile's A key or alternatively, its B key as last computed during authentication.

The mobile station's A key may be stored in so-called smart cards along with a processor that executes the authentication algorithm and generates the B keys. The smart card may be inhibited from outputting the A key and restricted to outputting the temporary B keys only, which are used perhaps only for a single conversation or transaction and are then erased. In this case, a mobile-to-mobile call can comprise the network computer simultaneously commanding both the calling and called mobile stations to execute authentication using network supplied random challenges, and then to decipher an enciphered key using the B key produced in order to obtain the common key to be used for direct mobile-to-mobile encryption.

According to another embodiment of the present invention, a continuous authentication procedure is provided for continuously verifying the identity of mobile stations that have been granted a direct relay connection by the mobile switching center. Signals transmitted by the mobile stations are encrypted using a key established during call set up in an authentication transaction between the mobile switching center and each mobile station. The initial authentication procedure and subsequent encryption may take place, for example, according to U.S. Pat. Nos. 5,091,942; 5,282,250; and 5,060,266, all of which are expressly incorporated herein by reference.

The mobile switching center monitors encryption transmissions and if the transmissions do not conform with the established key, then the mobile switching center may terminate the connection and direct the billing computer to cease accumulating charges and charge only for those periods of connection in which valid signals were confirmed. As an alternative, the mobile switching center may periodically issue a SACCH message commanding a mobile station to perform an authentication calculation and return a response. If the response is invalid or not received within a specific period of time, the mobile switching center may terminate the connection and instruct the billing computer to cease accumulating charges and charge the user only for the periods of connection for which valid responses were confirmed.

It will be appreciated by those of ordinary skill in the art that the present invention can be embodied in other specific forms without departing from the spirit or central character thereof. The presently disclosed embodiments are, therefore, considered in all respects to be illustrative and not restrictive. The scope of the invention is indicated by the appended claims rather than the foregoing description, and all changes which come within the meaning and range of equivalence thereof are intended to be embraced therein.

What is claimed is:

1. A communication system which reduces loop delay when a first mobile station calls a second mobile station, said first and second mobile stations being served by a same relay station, comprising:
    said relay station for communicating with said first and second mobile stations;
    a transponder means located in said relay station for relaying signals received from one mobile station on a first frequency band to another mobile station on a second frequency band; and
    control means for controlling the operation of said transponder means using control information.

2. A communication system according to claim 1, wherein said relay station is a base station in a land based cellular communication system.

3. A communication system according to claim 1, wherein said relay station is a satellite in a satellite communication system.

4. A communication system according to claim 1, wherein said relay station includes an elastic buffer for temporarily storing signals received from the mobile stations.

5. A communication system according to claim 1, wherein said transponder means also sends the signals received from the mobile stations to the control means which uses the signals when generating said control information.

6. A communication system according to claim 1, wherein said control means is a mobile switching center.

7. A communication system according to claim 5, wherein said control means adjusts the power at which control information is sent to the transponder.

8. A communication system according to claim 5, wherein a message from said control means can be relayed to one of said mobile stations using control information to temporarily interrupt communication between the first and second mobile station.

9. A communication system according to claim 8, wherein said message is a fast associated control channel message.

10. A communication system according to claim 8, wherein said message is a slow associated control channel message.

11. A communication system according to claim 1, wherein said transponder is a demodulate-remodulate transponder.

12. A method for providing encryption of a call between two mobile stations relayed through a satellite in a mobile satellite communication system, comprising the steps of:
    requesting an enciphered connection with a second mobile station;
    determining whether the second mobile station is reachable only by a satellite relay station;
    allocating a direct mobile-to-mobile transponder channel in the satellite for the call when the second mobile station is only reachable by a satellite;
    allocating a first enciphering key to be used by both of the mobile stations;
    sending identification of said transponder channel and said first enciphering key to the first mobile station;
    informing the second mobile station of the call, identification of said transponder channel and said first enciphering key; and
    connecting the call.

13. A method according to claim 12, wherein said system sends the identification of the transponder channel and the first enciphering key to the first mobile station using a second enciphering key.

14. A method according to claim 13, wherein the second enciphering key is the first mobile station's A-key.

15. A method according to claim 13, wherein the second enciphering key is the first mobile station's B-key.

16. A method according to claim 12, wherein said system sends the identification of the transponder channel and said first enciphering key to the second mobile station using a third enciphering key.

17. A method according to claim 16, wherein the third enciphering key is the second mobile station's A-key.

18. A method according to claim 16, wherein the third enciphering key is the second mobile station's B-key.

19. An authentication procedure for verifying the identity of mobile stations which have been granted a direct relay connection, comprising the steps of:

establishing a key for encrypting signals transmitted by the mobile stations during call setup;

periodically monitoring at a mobile switching center and comparing encrypted signals transmitted between the mobile stations to said established key;

terminating the connection when the encrypted signals do not correspond to said established key.

20. An authentication procedure according to claim 19, wherein said mobile switching center continuously monitors the encrypted signals.

21. An authentication procedure for verifying the identity of mobile stations which have been granted a direct relay connection by a mobile switching center, comprising the steps of:

establishing a predetermined authentication calculation during call set-up;

periodically issuing a SACCH message from said mobile switching center instructing at least one of the mobile stations to perform the predetermined authentication calculation;

transmitting a result of said predetermined authentication calculation to said mobile switching center;

terminating the connection when the result is invalid.

22. An authentication procedure according to claim 21, wherein the connection is terminated when the result is not received within a predetermined period of time.

* * * * *